US008639628B2

United States Patent
Popp

(10) Patent No.: US 8,639,628 B2
(45) Date of Patent: Jan. 28, 2014

(54) TOKEN AUTHENTICATION SYSTEM AND METHOD

(75) Inventor: Nicolas Popp, Menlo Park, CA (US)

(73) Assignee: Symantec Corporation, Mountain View, CA (US)

( * ) Notice: Subject to any disclaimer, the term of this patent is extended or adjusted under 35 U.S.C. 154(b) by 2055 days.

(21) Appl. No.: 10/590,415

(22) PCT Filed: Feb. 23, 2005

(86) PCT No.: PCT/US2005/005481
§ 371 (c)(1),
(2), (4) Date: Oct. 20, 2006

(87) PCT Pub. No.: WO2005/083610
PCT Pub. Date: Sep. 9, 2005

(65) Prior Publication Data
US 2007/0050635 A1    Mar. 1, 2007

Related U.S. Application Data

(60) Provisional application No. 60/546,194, filed on Feb. 23, 2004.

(51) Int. Cl.
*G06Q 99/00* (2006.01)

(52) U.S. Cl.
USPC .......................................................... 705/67

(58) Field of Classification Search
USPC .......................................................... 705/67
See application file for complete search history.

(56) References Cited

U.S. PATENT DOCUMENTS

| | | | |
|---|---|---|---|
| 4,731,575 A * | 3/1988 | Sloan | 324/113 |
| 5,892,900 A * | 4/1999 | Ginter et al. | 726/26 |
| 5,953,420 A * | 9/1999 | Matyas et al. | 713/171 |
| 5,961,593 A * | 10/1999 | Gabber et al. | 709/219 |
| 6,327,658 B1 | 12/2001 | Susaki et al. | |
| 6,615,353 B1 | 9/2003 | Hashiguchi | |
| 7,392,390 B2 * | 6/2008 | Newcombe | 713/170 |
| 2003/0172269 A1* | 9/2003 | Newcombe | 713/168 |
| 2004/0139028 A1* | 7/2004 | Fishman et al. | 705/67 |

FOREIGN PATENT DOCUMENTS

JP    2002297547 A    10/2002

* cited by examiner

*Primary Examiner* — James D Nigh
(74) *Attorney, Agent, or Firm* — Lowenstein Sandler LLP

(57) ABSTRACT

A method for calculating a One Time Password. A secret is concatenated with a count, where the secret is uniquely assigned to a token. The secret can be a private key or a shared secret symmetric key. The count is a number that increases monotonically at the token with the number of one-time Passwords generated at the token. The count is also tracked at an authentication server, where it increases monotonically with each calculation of a one-time Password at the authentication server. An OTP can be calculated by hashing a concatenated secret and count. The result can be truncated.

11 Claims, 2 Drawing Sheets

TOKEN AUTHENTICATION SYSTEM AND METHOD

This is a 371 national phase application of PCT/US2005/005481 filed 23 Feb. 2005, claiming priority to U.S. provisional application No. 60/546,194 filed 23 Feb. 2004, the contents of which are incorporated herein by reference.

FIELD OF THE INVENTION

The field of the invention is authentication, and in particular authentication using a hardware device.

SUMMARY OF THE INVENTION

A method for calculating a One Time Password. A secret is concatenated with a count, where the secret is uniquely assigned to a token. The secret can be a private key or a shared secret symmetric key. The count is a number that increases monotonically at the token with the number of One Time Passwords generated at the token. The count is also tracked at an authentication server, where it increases monotonically with each calculation of a One Time Password at the authentication server. An OTP can be calculated by hashing a concatenated secret and count. The result can be truncated.

BACKGROUND OF THE INVENTION

A common step in deciding whether to grant a request for access to data or services in a network is to identify and authenticate the requesting user. Authentication includes the process of verifying the identity of a user. A known identification and authentication system includes associating a user identifier ("user id") and a secret ("password") for a user. The password can be a secret shared between the user and an authentication service. The user can submit his user id and password to the authentication service, which compares them with a user id and associated password that can be stored at the service. If they match, then the user is said to have been authenticated. If not, the user is said not to be authenticated.

A token is a device that can be used to authenticate a user. It can include one or more secrets, some of which can be shared with a validation center. For example, a token can store a secret key that can be used as the basis for calculating a One Time Password (OTP). A OTP can be a number (or alphanumeric string) that is generated once and then is not reused. The token can generate an OTP and send it along with a unique token serial number to an authentication server. The authentication server can calculate an OTP using its copy of the secret key for the token with the received serial number. If the OTPs match, then the user can be said to be authenticated. To further strengthen the link from the user to the token, the user can establish a secret Personal Identification Number (PIN) shared with the token that must be entered by the user to unlock the token. Alternatively, the PIN can be shared between the user, the token and the authentication server, and can be used with other factors to generate the OTP. A token typically implements tamper-resistant measures to protect the secrets from unauthorized disclosure.

DETAILED DESCRIPTION

Figure 1:
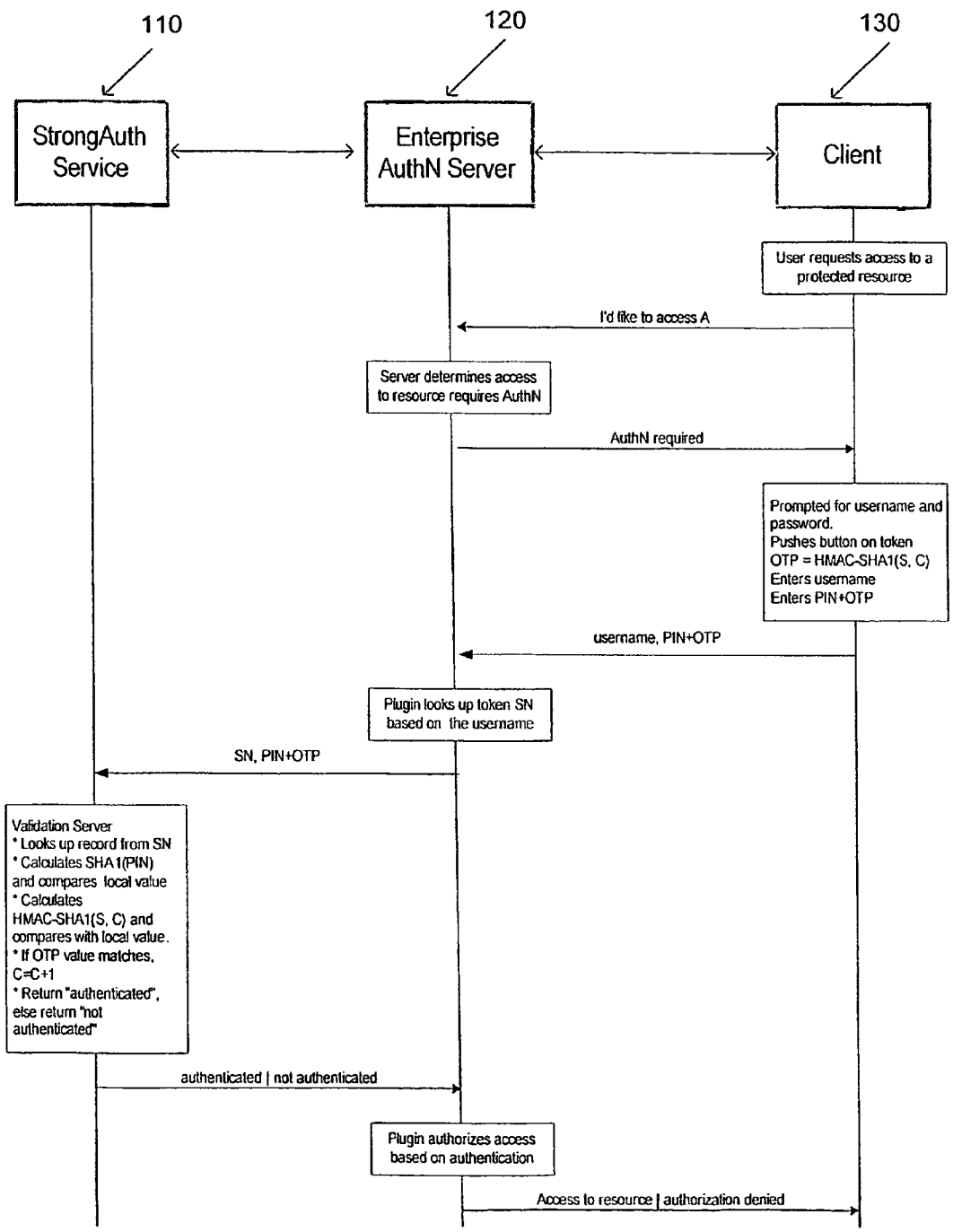
FIG. 1 shows an authentication procedure in accordance with an embodiment of the present invention.

An embodiment of the present invention includes a protocol for generating One Time Passwords ("OTPs") at a hardware device that can be used to authenticate a user. The OTPs are generated by a token, which can be a physical device that includes mechanisms to prevent the unauthorized modification or disclosure of the software and information that it contains, and to help ensure its proper functioning.

An embodiment of this protocol can be sequence based, and can be two-factor, e.g., based upon something the user knows (such as a Personal Identification Number, a secret shared between the user and the authentication service) and a physical device having special properties (e.g., a unique secret key such as a private key, or a shared secret symmetric key) that the user possesses (e.g., a token.)

The protocol for generating the OTPs can be based upon a counter, e.g., a monotonically increasing number based, for example, on the number of times a OTP has been requested from the token. The value of the OTP can be displayed on a token, and can be easily read and entered by the user, e.g., via a keyboard coupled to a computer that is in turn coupled to a network. The OTP can be transportable over the RADIUS system.

An embodiment of the protocol in accordance with the present invention can based on an increasing counter value and a static symmetric key known only to the token and an authentication service (the "strong auth" service.) An OTP value can be created using the HMAC-SHA1 algorithm as defined in RFC 2104, or any other suitable hash algorithm. This hashed MAC algorithm has the strength of SHA-1, but allows the addition of a secret during the calculation of the output.

The output of the HMAC-SHA1 calculation is 160 bits. However, this value can be truncated to a length that can be easily entered by a user. Thus, $$OTP=\mathrm{Truncate}(\mathrm{HMAC\text{-}SHA1}\ (\mathrm{Count},\ \mathrm{Secret}))$$

Both the client and authentication server can calculate the OTP value. If the value received by the server matches the value calculated by the server, then the user can be said to be authenticated. Once an authentication occurs at the server, the server increments the counter value by one.

Although the servers counter value can be incremented after a successful OTP authentication, the counter on the token can be incremented every time the button is pushed. Because of this, the counter values on the server and on the token can often be out of synchronization. Indeed, there is a good chance that the token will always be out of synchronization with the server given the user environment (e.g., the user pushes the button unnecessarily, button is pushed accidentally, user mistypes the OTP, etc.)

Because the server's counter will only increment when a valid OTP is presented, the server's counter value on the token is expected to always be less than the counter value on token. It is important to ensure that resynchronization is to ensure it's not a burden to either the user or the enterprise IT department.

Synchronization of counters is in this scenario can be achieved by having the server calculate the next n OTP values and determine if there is a match, where n is an integer. If we assume that the difference between the count at the token and the count at the server is 50, then depending on the implementation of the strong auth server, the server would at most have to calculate the next 50 OTP values. Thus, for example, if the correct OTP is found at the n+12 value, then the server can authenticate the user and then increment the counter by 12.

It is important to carefully choose a value for n that can be easily calculated by the server. There should be upper bounds to ensure the server doesn't check OTP values forever, thereby succumbing to a Denial of Service attack. Truncating the HMAC-SHA1 value to a 6 character value could make a brute force attack easy to mount, especially if only numeric digits are used. Because of this, such attacks can be detected and stopped at the strong auth server. Each time the server calculates an OTP that does not validate, it should record this and implement measures to prevent being swamped, e.g., at some point, turn away future requests for validation from the same source. Alternatively, the user can be forced to wait for a longer period of time between validation attempts.

Once a user is locked out, the user can be to "self unlock" by providing a web interface that would require the user, for example, to enter multiple OTP in a sequence, thus proving they have the token.

Once the shared secret has been combined with the counter, a 160 bit (20-byte) HMAC-SHA1 result can be obtained. In one embodiment, at most four bytes of this information for our OTP. The HMAC RFC (RFC 2104—HMAC: Keyed-Hashing for Message Authentication ) further warns that we should use at least half the HMAC result in Section 5, Truncated Output:

Applications of HMAC can choose to truncate the output of HMAC by outputting the t leftmost bits of the HMAC computation . . . We recommend that the output length t be not less than half the length of the hash output . . . and not less than 80 bits (a suitable lower bound on the number of bits that need to be predicted by an attacker).

Thus, another way is needed to choose only four or fewer bytes of the HMAC result in a way that will not weaken either HMAC or SHA1. In one, dynamic offset truncation, described below, can be used.

Dynamic offset truncation.

The purpose of this technique is to extract a four byte dynamic binary code from an HMAC-SHA1 result while still keeping most of the cryptographic strength of the MAC.

1. Take the last byte (byte 19)
2. Mask off the low order four bits as the offset value
3. use the offset value to index into the bytes of the HMAC-SHA1 result.
4. return the following four bytes as the dynamic binary code.

The following code example describes the extraction of a dynamic binary code given that hmac_result is a byte array with the HMAC-SHA1 result:

```
int offset   = hmac_result[19] & 0xf ;
int bin_code = (hmac_result[offset]  & 0x7f) << 24
   | (hmac_result[offset+1] & 0xff) << 16
   | (hmac_result[offset+2] & 0xff) <<  8
   | (hmac_result[offset+3] & 0xff) ;
```

The following is an example of using this technique:

SHA-1 Hash bytes

| 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|----|----|----|----|----|----|----|----|----|----|
| 1f | 86 | 98 | 69 | 0e | 02 | ca | 16 | 61 | 85 | | | | | da | 8e | 94 | 5b | 55 | 5a |

1. The last byte (byte 19) has the hex value 0x5a.
2. The value of the lower four bits is 0xa (the offset value).
3. The offset value is byte 10 (0xa).
4. The value of the four bytes starting at byte 10 is 0x50ef7f19 which is the dynamic binary code.

We treat the dynamic binary code as a 31 bit, unsigned, big-endian integer; the first byte is masked with a 0×7f.

The One Time Password for a given secret and moving factor can vary based on three parameters: Encoding Base, Code Digits, and Has Checksum. With 10 as an Encoding Base, 7 Code Digits and Has Checksum set to TRUE, we continue with the above example:

The hex value 0×50ef7f19 converts to 1357872921 base 10.

The last 7 digits are 7872921

The credit card checksum of the code digits calculates 7 as the checksum. 10−((5+8+5+2+9+2+2)mod 10)=10−(33 mod 10)=10−3=7

Yielding the following OTP: 78729217

The following is the Glossary of terms used in this application:

Checksum Digit—Result of applying the Credit-Card checksum algorithm to the Code Digits. This digit is optional. This check should catch any single transposition or any single character mistyped.

Code Digits—This parameter indicates is the number of digits to be obtained from the binary code. We calculate the Code Digits by converting the Binary Code to the Encoding Base, zero padding to be at least Code Digits, and taking the right hand (low order) digits. With ten as an Encoding Base, no more than nine Code Digits can be supported by the 31-bit Binary Code.

Credit Card checksum algorithm—This checksum algorithm has the advantage that it will catch any single mistyped digit, or any single adjacent transposition of two digits. These are the most common types of user errors.

Encoding Base—This parameter indicates what base to use for the password. Base 10 is the preferred base because it can be entered in a numeric pad.

Has Checksum Digit—This boolean parameter indicates if a checksum digit should be added to create the OTP. If there is no checksum digit, just the Code Digits are used as the OTP. If there is a checksum digit, it is calculated using the Code Digits as input to the Credit-Card checksum algorithm.

OTP—The One-Time-Password. This value is constructed by appending the Checksum Digit, if any, to the right of the Code Digits. If there is no Checksum Digit, the OTP is the same as the Code Digits.

The One Time Number value is calculated by first shifting in the Hash Bits, and then the Synchronization Bits, and then shifting in the result of the check_function ( ) of the prior intermediate value.

The binary value is then translated to appropriate character values. There are three likely character representations of the password: Decimal, Hexadecimal, and Alpha-Numeric.

|  | Decimal | Hexadecimal | Alpha-Numeric |
|---|---|---|---|
| Required Display Type | 7-Segment | 7-Segment | Alpha-Numeric |
| Conversion Cost | Moderate | Trivial | Simple |
| Bits per character | 3.2 | 4 | 5 |
| Keyboard Entry | Simple | Easy | Easy |
| Cell Phone Entry | Easy | Difficult | Difficult |

Decimal.

The token can convert the dynamic binary code to decimal and then display then last Code Digits plus optionally the checksum. For example, for a six digit, no checksum, decimal token will convert the binary code to decimal and display the last six digits.

Hexadecimal.

The token can convert the dynamic binary code to hexadecimal and then display then last Code Digits plus optionally the checksum. For example, for a six digit, no checksum, hexadecimal token will convert the binary code to hexadecimal and display the last six digits.

Alphanumeric.

The token can convert the dynamic binary code to base 32 and then display then last Code Digits plus optionally the checksum. For example, for a six digit, no checksum, base 32 token will convert the binary code to base 32 and display the last six digits.

The PIN.

In order to be a true two-factor authentication token, there can also be a "what you know" value in addition to the "what you have" value of the OTP. This value is usually a static PIN or password known only to the user. This section discusses three alternative architectures to validate this static PIN in accordance with the present invention.

PIN Validation in the Cloud.

Enabling PIN validation in the cloud can bind a single PIN to a single token. The PIN should be protected over the wire to ensure its not revealed. PIN management (set, change) should be implemented by the strong auth service.

PIN Validation at the Enterprise.

Enabling PIN validation in the cloud may mean multiple PIN's for a single token.

The PIN need never leave the "security world" of the enterprise. PIN management can be implemented by the enterprise.

PIN Validation at the Token.

This embodiment can be implemented using a keypad on the token. The PIN is never sent over the wire, and may be used as a seed to the OTP algorithm. The PIN may be used to simply unlock the token.

Example Data Flows.

This section describes two data flow scenarios. The first scenario assumes that the StrongAuth service does not knows the username associated with a token. In this scenario it is assumed that the PIN management operations require the user to enter their token SN, instead of their user name.

The second scenario is very similar to the first, except by the fact that the user name is the key into the StrongAuth service, instead of the token SN. There are a few issues in this case. First, the username is known to the service, and second we must come up with a scheme to ensure a unique mapping from a username to a token SN FIG. 1 shows an authentication procedure in accordance with an embodiment of the present invention. It assumes the following:
  Token SN and S distributed to StrongAuth Service
  Customer account associated with each token
  PIN associated with a particular token
  StrongAuth service saves only the SHA-1 hash of the PIN in the DB
  Token SN added as an attribute to the user account at the Enterprise, the plugin maps the username to the SN.
  A strong authentication server 110, an enterprise authentication server 120 and a client 130 are coupled, e.g., through a network (not shown.) As shown in FIG. 1, a user at the client sends a request for access to a protected resource to enterprise server 120. The server determines if access to the resource requires authentication. If so, it sends an "authentication required" message to the client 130. The user can be prompted for a username and a password. The user can push the button on his token (not shown) to obtain a OTP. The OTP can be generated as described above, e.g., by hashing a combination of the token secret and the present value for the count as it is stored at the token. The user then enters his username and his Personal Identification Number (PIN) concatenated to the OTP provided by the token. This information is sent to the enterprise server 120. The enterprise server 120 looks up the token serial number based on the username, and sends the serial number and the PIN+OTP to the authentication server 110. The authentication server 110 looks up a record based upon the serial number to obtain local hashed values of the PIN and the secret and purported count. This can be done because the token secret can be shared between the token to which it is uniquely assigned and the authentication server 110. The authentication server then calculates an OTP based upon the secret for the token and the current value of the count for that token stored at the authentication server. If the calculated OTP matches the received OTP, then the value of the count at the authentication server 110 is incremented by one. Otherwise, the authentication server can try again to calculate the OTP by incrementing the count for the token and hashing it with the secret for the token. This can be done because, as described above, the count value at the authentication server 110 may be different than the count value at the token (not shown.) This procedure can be repeated any number of times within reason to enable the count value to "catch up" with the count value at the token. In an embodiment, the number of such repeated tries to authenticate a token at the authentication server is terminated after a predetermined number of the same, e.g., 12. In the event that the token cannot be successfully authenticated by the authentication server 110, the authentication server sends an "not authenticated" message to the enterprise server 120. If the token is successfully authenticated, then the authentication server sends an "authenticated" message to the enterprise server 120. Based upon the result obtained from the authentication server 110, the enterprise server denies or grants, respectively, the requested permission from the client to access a resource.

Figure 2:
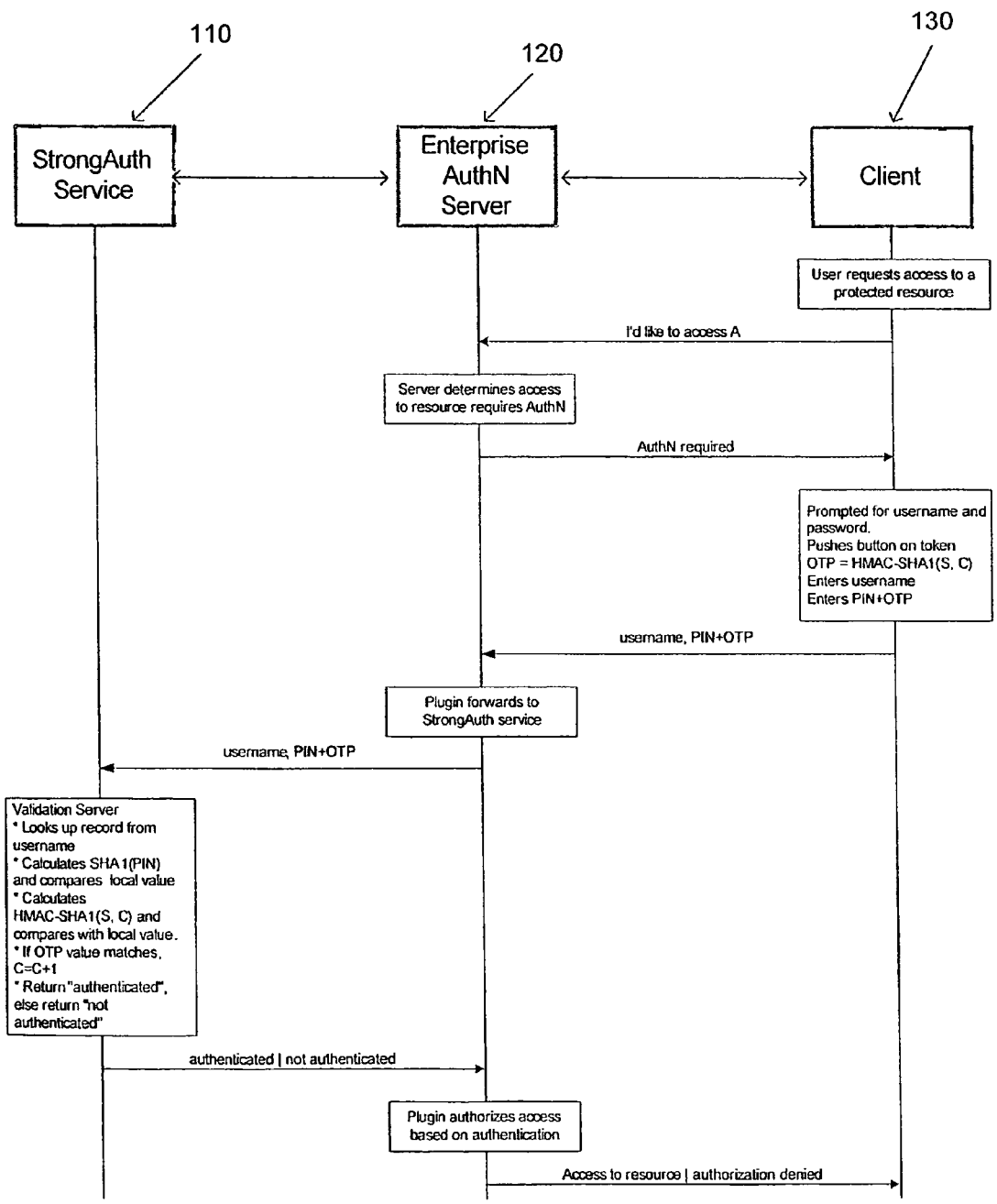
FIG. 2 shows an authentication procedure in accordance with another embodiment of the present invention.

FIG. 2 shows an authentication procedure in accordance with another embodiment of the present invention. It assumes the following:
  Token SN and S distributed to StrongAuth Service
  Customer account and username is associated with each, token PIN associated with a particular token
StrongAuth service saves only the SHA-1 hash of the PIN in the DB
Username is forwarded from enterprise to the Strong Auth service.

The authentication procedure of FIG. 2 is the same as for FIG. 1 until just after the username and PIN+OTP is sent from the client 130 to the enterprise server 120. Rather than look up the token serial number based upon the username, the enterprise server 120 forwards the authentication request (including the username and PIN+OTP) to the authentication server 110. The authentication server looks up a record based upon the username, can verify the PIN, and then follow the same procedure as shown in FIG. 1 for the rest of the process.

What is claimed is:

1. A method for calculating One Time Passwords, comprising:
   concatenating, by a computer, a secret with a count, where the secret is uniquely assigned to a token and is shared between the token and an authentication server, and the count is a number that increases monotonically at the token with a number of One Time Passwords generated by the token and increases monotonically at the authentication server with each calculation by the authentication server of a One Time Password;
   calculating, by the computer, a hash based upon the concatenated secret and count; and
   truncating the result of the hash to obtain a new One Time Password.

2. A method for authenticating a request for access to a resource, comprising:
   receiving, by an authentication server, a request for authentication that includes a serial number that is uniquely associated with a token, a personal identification number associated with a user and a One Time Password generated by the token, wherein the One Time Password is based upon a value of a first count at the token and a secret shared between the token and the authentication server;
   retrieving, by the authentication server, a value of a second count that corresponds to the token based upon the serial number;
   retrieving, by the authentication server, the secret that corresponds to the token based upon the serial number;
   calculating, by the authentication server, a value of an additional One Time Password based upon retrieved values of the second count and the secret corresponding to the token;
   comparing the calculated One Time Password with the received One Time Password;
   if the calculated One Time Password corresponds to the received One Time Password, determining that the request is authenticated;
   if the calculated One Time Password does not correspond to the received One Time Password, then incrementing the value of the second count at the authentication server and recalculating the additional One Time Password based upon the incremented value of the second count and the secret, and comparing the recalculated One Time Password with the received One Time Password; and
   if the recalculated One Time Password does not correspond to the received One Time Password, then repeating to increment the second count and to recalculate the additional One Time Password until the recalculated One Time Password corresponds to the received One Time Password.

3. The method of claim 2, wherein the hash function is SHA-1.

4. The method of claim 2, wherein the secret is a symmetric cryptographic key.

5. The method of claim 2, wherein incrementing the count and recalculating the additional One Time Password is repeated a predetermined number of times, and if the recalculated One Time Password does not correspond to the received One Time Password by the end of the predetermined number of times, the request is determined to be not authenticated.

6. A method for authenticating a request for access to a resource, comprising:
   receiving, by an authentication server, a request for authentication that includes a username that is uniquely associated with a user, a personal identification number associated with a user and a One Time Password generated at a token, wherein the One Time Password is based upon a value of a first count at the token and a secret shared between the token and the authentication server;
   retrieving, by the authentication server, a value of a second count that corresponds to the token based upon the username;
   retrieving, by the authentication server, the secret that corresponds to the token based upon the username;
   calculating, by the authentication server, a value of an additional One Time Password based upon retrieved values of the count and the secret corresponding to the token;
   comparing the calculated One Time Password with the received One Time Password; and
   if the calculated One Time Password corresponds to the received One Time Password, determining that the request is authenticated;
   if the calculated One Time Password does not correspond to the received One Time Password, then incrementing the value of the second count at the authentication server and recalculating the additional One Time Password based upon the incremented count and the secret, and comparing the recalculated One Time Password with the received One Time Password; and
   if the recalculated One Time Password does not correspond to the received One Time Password, then repeating to increment the second count and to recalculate the additional One Time Password until the recalculated One Time Password corresponds to the received One Time Password.

7. The method of claim 6, wherein the hash function is SHA-1.

8. The method of claim 6, wherein the secret is a symmetric cryptographic key.

9. The method of claim 6, wherein incrementing the count and recalculating the additional One Time Password is repeated a predetermined number of times, and if the recalculated One Time Password does not correspond to the received One Time Password by the end of the predetermined number of times, the request is determined to be not authenticated.

10. The method of claim 2, wherein the secret is uniquely assigned to the token.

11. The method of claim 6, wherein the secret is uniquely assigned to the token.

* * * * *